June 14, 1960 S. C. ROGERS 2,941,154

PARALLEL TRANSISTOR AMPLIFIERS

Filed Dec. 10, 1957

INVENTOR
S. C. ROGERS
BY W. L. Keefauver
ATTORNEY

United States Patent Office 2,941,154

Patented June 14, 1960

2,941,154

PARALLEL TRANSISTOR AMPLIFIERS

Samuel C. Rogers, Morristown, N.J., assignor to Bell Telephone Laboratories, Incorporated, New York, N.Y., a corporation of New York Filed Dec. 10, 1957, Ser. No. 701,932

11 Claims. (Cl. 330—29)

Figure 1:
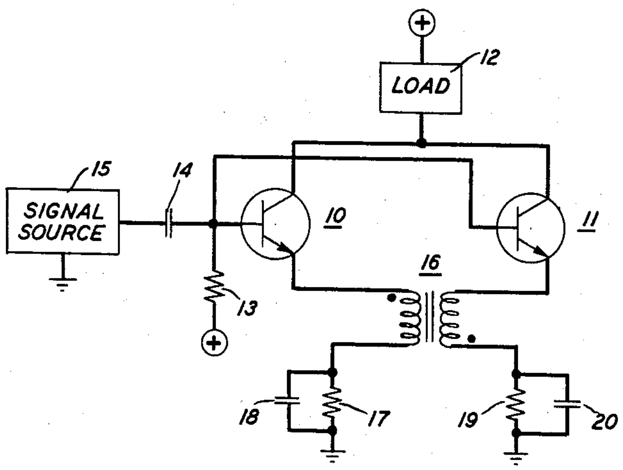

This invention relates to parallel circuits containing active gain-producing devices in their branches, and in particular, to means for compensating for variations in the alternating-current characteristics of active devices contained in branches of parallel circuits.

Active gain-producing devices or elements are sometimes connected in parallel to obtain greater power outputs or in circuits to form similar amplifiers for producing several related output waves. When active devices are used in either manner, it is generally desirable to use identical units. If identical units are not used where several active elements are connected, for example, between a common source and a common load, one of the elements assumes more than its share of the load. Because one unit assumes more than its share of the load, a maximum power output is obtainable which is substantially less than the sum of the maximum power outputs of the individual units. Another example of the desirability of using identical units is where several active devices are connected between a common source and respective loads to form what is commonly referred to as a distributing amplifier. When identical units are not used in a circuit of this type, the several output waves produced by the amplifier may differ substantially from one another.

Although it may be desirable to utilize identical active devices in parallel circuits, it is not always practical to put this into effect. It is generally necessary to screen a number of transistors in order to find two identical units. A screening of this nature is not very practical as it requires a large number of transistors for screening and a considerable amount of time and equipment for the screening process.

One technique for reducing the undesirable effects produced by the use of dissimilar active devices utilizes compensating means. The direct-current parameters of these devices may be balanced by well-known techniques using parallel combinations of resistors and capacitors. Prior to the present invention, compensating means for balancing the alternating-current parameters of slightly dissimilar active devices have not always been as successful as desired.

It is an object of the present invention to compensate for variations occurring in the alternating-current parameters of active devices operated in parallel in a manner less complicated, less expensive and more reliable than any heretofore known.

It is a further object to compensate for variations occurring in the alternating-current parameters of active devices used in parallel circuits in a manner so that the compensating means will not require adjustment when these parameters change either with aging or replacement of one or more of the devices.

In one of its broad aspects, the invention takes the form of a parallel circuit having an active device in each of its branches and the windings of a unity-ratio transformer connected in series with respective branches so that signals appearing across the windings control, along with an input signal to the devices, the operation of the devices. The windings of the transformer are connected in the branch circuits so that no changing flux is produced in the transformer core when the branch alternating currents are equal and, therefore, no electrical coupling exists between the branch circuits under these conditions. When one of the branch alternating currents exceeds the other, changing flux is produced which provides cross-coupling in a manner to eliminate substantially the branch current difference.

One preferred embodiment of the invention includes two transistors having their base electrodes connected to a common input terminal, their collector electrodes connected to a common load, and their emitter electrodes connected to extremities of respective windings of a unity-ratio transformer. The remaining extremities of the unity-ratio transformer may be directly connected to ground or they may be connected to respective biasing means in order to balance the direct-current characteristics of the transistors. The transformer windings are connected in the emitter circuits in a phase reversal sense. When the emitter alternating currents are equal, no changing flux is produced in the transformer and, consequently, no electrical cross-coupling is produced. When one emitter current exceeds the other as a result, primarily, of one collector current exceeding the other, changing flux is produced in the transformer which, in turn, generates voltages across the transformer windings. One of these voltages opposes the base drive on the transistor having the larger emitter current while the other voltage aids the base drive on the transistor having the smaller emitter current. By aiding and opposing the base drives on the transistors in this manner, the difference between the collector alternating currents is reduced substantially.

In another embodiment of the invention, separate loads are connected to respective ones of the transistor collector electrodes in order to provide a pair of substantially identical output waves. The remainder of the circuit is substantially identical to that described with respect to the first-mentioned embodiment.

Figure 2:
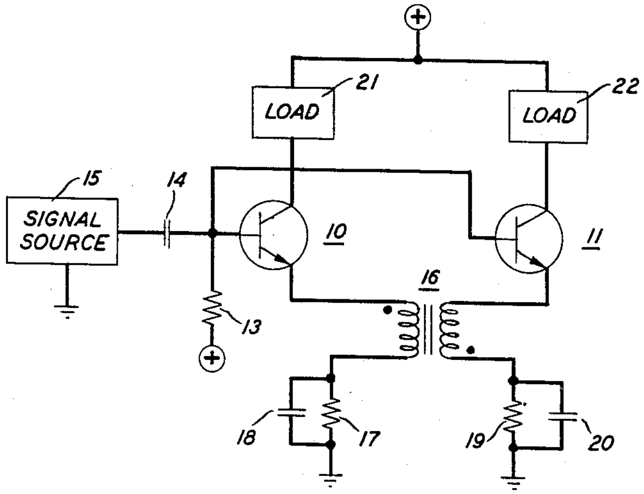

Other objects and features of the invention will be apparent from a study of the following detailed description of several specific embodiments. In the drawings:

Fig. 1 shows a schematic diagram of one specific embodiment of the invention utilizing transistors in which a common load is provided; and Fig. 2 shows a schematic diagram of another specific embodiment of the invention in which separate loads are provided for the transistors.

In Fig. 1, a schematic diagram of one embodiment of the invention is shown in which two transistors 10 and 11 have their respective collector electrodes connected to one extremity of a load 12. The remaining extremity of load 12 is connected to an unillustrated source of positive energizing potential. The base electrodes of transistors 10 and 11 are each connected to a resistor 13, which, in turn, is connected to an unillustrated source of positive biasing potential. The remaining terminals of the unillustrated sources are grounded. The sources are connected so that the collector-base circuits are reverse biased and the emitter-base circuits are forward biased. A coupling capacitor 14 is connected between a signal source 15 and the base electrodes of transistors 10 and 11, while the remaining terminal of the source 15 is grounded. One extremity of each of the windings of a unity-ratio transformer 16 is connected to respective ones of the emitter electrodes of transistors 10 and 11. A biasing circuit comprising a resistor 17 and a capacitor 18, arranged in parallel, is connected between the remaining extremity of one winding of transformer 16 and ground, while a second biasing circuit comprising a resistor 19 and a capacitor 20, arranged in parallel, is connected between the remaining extremity of the other winding of transformer 16 and ground. The biasing circuits, which do not affect the alternating-current characteristics of transistors 10 and 11, determine their direct-current operating points. The phasing of the transformer 16 connected in the emitter circuits is such that when equal emitter alternating currents flow, no changing flux is produced in the transformer.

Transformer 16 has a turns ratio equal to unity and is connected in a phase reversal sense in the emitter circuits of transistors 10 and 11. Because transformer 16 has a unity ratio and is connected in a phase reversal sense, equal emitter alternating currents do not produce any changing flux in the transformer and, consequently, no electrical coupling is provided between the emitter circuits. When the emitter alternating current of transistor 10 exceeds that of transistor 11 as a result, primarily, of the collector alternating current of transistor 10 exceeding that of transistor 11, changing flux is produced in transformer 16 which, in turn, generates voltages across the windings. The polarities of these voltages, which are opposite with respect to one another because of the phasing of the transformer 16, increase the base drive on transistor 11 and reduce the base drive on transistor 10, to thereby increase and decrease, respectively, their collector currents. Conversely, if the emitter alternating current of transistor 11 exceeds that of transistor 10, voltages are produced across the windings of transformer 16 which increase the drive on the base of transistor 10 and decrease the drive on the base of transistor 11. By controlling the base drives on the transistors in this manner, the collector current of the transistor having the larger emitter current is reduced while the collector current of the transistor having the smaller emitter current is increased. A balanced condition exists when the difference in the collector currents is just sufficient to control the base drives to produce that difference. Through the use of this circuit arrangement, which utilizes the inherent current gain between the base and collector current, the difference between the collector alternating currents is reduced substantially.

In Fig. 2, a schematic diagram of another preferred embodiment of the invention is shown in which components identical with those shown in Fig. 1 have been assigned like symbol numbers. This embodiment, which takes the form of a distributing amplifier, is similar to the embodiment shown in Fig. 1, with the exception that the collector electrodes of transistors 10 and 11 are connected to separate loads 21 and 22, respectively. The unity-ratio transformer 16 is connected and operates in the emitter circuits of transistors 10 and 11 in a manner identical to that of transformer 16 in the circuit of Fig. 1. Substantially identical output waves are developed across the load resistors 21 and 22 as a result of the compensation provided by the present invention.

To demonstrate the compensating characteristics of the present invention, a large difference in alternating-current parameters was achieved by using an alloy junction type transistor and a grown junction type transistor in a distributing amplifier conforming to the schematic diagram of Fig. 2. $\alpha$, the ratio of change in collector current to change in emitter current, and $h_{11}$, the ratio of input voltage to input current with the output shorted, of the transistors were:

| alloy junction transistor | grown junction transistor |
|---|---|
| $\alpha=.994$<br>$h_{11}=5.9$ ohms | $\alpha=.957$<br>$h_{11}=10.5$ ohms |

The following alternating-current voltages were produced at the collectors of the transistors, i.e., between collector and ground, with an input signal of 1,000 cycles per second:

| | Circuit with transformer shorted | Circuit as shown in Fig. 2 |
|---|---|---|
| | *volts* | *volts* |
| alloy transistor | 2.25 | 1.49 |
| grown transistor | 1.25 | 1.42 |

Even though these transistors were chosen so that there was a large difference between their alternating-current characteristics, the compensation provided through the use of the present invention in a distributing amplifier caused substantially identical output waves to be produced.

Although the invention has been discussed in detail only with respect to transistor circuits, it is to be understood that it is equally applicable to any parallel circuit in which the branch circuits contain active devices so arranged that signals introduced in the branch circuits control, along with input signals to the devices, the operation of the devices. In the vacuum tube art, for example, the windings of a unity-ratio transformer may be connected in respective cathode circuits of a pair of amplifying tubes in order to compensate for differences in the alternating-current characteristics of the tubes. Signals which appear across the windings of the transformer as a result of flux produced by unequal alternating currents influence the operation of the tubes to reduce substantially the difference in the alternating currents.

What is claimed is:

1. In combination, a source of signals to be amplified, a pair of amplifying devices each having a signal input path and a signal output path, means connecting the signal input paths of both of said amplifying devices substantially in parallel across said source, and a unity-ratio transformer having a first winding common to the signal input and output paths of one of said amplifying devices and a second winding common to the signal input and output paths of the other of said amplifying devices, said windings connected in said paths in a phase reversal sense whereby the signal amplitudes in the respective signal input paths are equalized by action of said transformer and substantially equal outputs are obtained from the respective signal output paths.

2. In combination, a source of signals to be amplified, a pair of amplifying devices each having a signal input path and a signal output path, means connecting the signal input paths of both of said amplifying devices substantially in parallel across said source, a unity-ratio transformer having a first winding common to the signal input and output paths of one of said amplifying devices and a second winding common to the signal input and output paths of the other of said amplifying devices, said windings connected in said paths in a phase reversal sense, a load circuit, and means connecting the signal output paths of both of said amplifying devices substantially in parallel across said load circuit, whereby the signal amplitudes in the respective signal input path are equalized by action of said transformer and the power supplied to said load is divided substantially equally between said amplifying devices.

3. In combination, a source of signals to be amplified, a pair of amplifying devices each having a signal input path and a signal output path, means connecting the signal input paths of both of said amplifying devices substantially in parallel across said source, a unity-ratio transformer having a first winding common to the signal input and output paths of one of said amplifying devices and a second winding common to the signal input and output paths of the other of said amplifying devices, said windings connected in said paths in a phase reversal sense, a pair of load circuits, and means connecting the signal output paths of each of said amplifying devices across a respective one of said load circuits, whereby the signal amplitudes in the respective signal input paths are equalized by action of said transformer and a substantially equal amount of power is applied to each of said load circuits by their respective ones of said amplifying devices.

4. In a circuit having two parallel branches, a pair of active gain-producing devices each having an input path and an output path, a portion of said output path being common to said input path in each of said devices, means serially connecting said output paths of said devices in respective ones of said branches, a source of signals, means connecting said input paths of said devices to said source of signals, a unity-ratio transformer having a pair of windings, and means serially connecting in a phase reversal sense said windings of said transformer in respective ones of said common portions of said input and output paths so that voltages appearing across said windings are added in series with signals from said source to equalize substantially the outputs in said output paths.

5. A circuit having two parallel branches comprising a pair of active gain-producing devices each having at least an input terminal, an output terminal and a common terminal, means connecting said output and common terminals of each of said devices in said branches so that said devices are serially connected in respective ones of said branches, a unity-ratio transformer having a pair of windings, means serially connecting said windings of said transformer in respective ones of said branches so that one extremity of each of said windings is connected to said common terminals of said devices, a source of signals, and means connecting said source of signals between the input terminals of said devices and the other extremities of said transformer windings, said windings being connected in a phase reversal sense with respect to said source of signals.

6. A circuit having two parallel branches comprising a pair of active gain-producing devices each having a first terminal in common with a second terminal and a third terminal to form input and output circuits respectively, a unity-ratio transformer having a pair of windings, means connecting said first terminals of said devices to an extremity of respective ones of said transformer windings, a source of signals, means connecting said source of signals between said second terminals of said devices and the remaining extremities of said transformer windings, said windings being connected in a phase reversal sense with respect to said source of signals, a source of energizing potential, and means connecting said source of energizing potential between said third terminals of said devices and said remaining extremities of said transformer windings.

7. A circuit having two parallel branches comprising a pair of active gain-producing devices each having at least three electrodes, a source of energizing potential, a common load connected between one of said electrodes of each of said devices and said source of energizing potential, a unity-ratio transformer having a pair of windings, means connecting one of the remaining said electrodes of each of said devices to an extremity of respective ones of said transformer windings, means connecting the remaining extremities of said transformer windings to said source of energy potential, a source of signals and means connecting said source of signals between the remaining electrode of each of said devices and said remaining extremities of said transformer windings, said windings being connected in a phase reversal sense with respect to said source of signals.

8. A circuit comprising a pair of transistors each having a collector electrode, an emitter electrode and a base electrode, a unity-ratio transformer having a pair of windings, means connecting said emitter electrodes to an extremity of respective ones of said transformer windings, a source of signals, means connecting said source of signals between said base electrodes and the remaining extremities of said transformer windings, said transformer windings being connected between said emitter electrodes and said source of signals in a phase reversal sense with respect to said source of signals, a load, means connecting one end of said load to said collector electrodes, a source of energizing potential, and means connecting said source of energizing potential between the other end of said load and said remaining extremities of said transformer windings.

9. A circuit having two parallel branches comprising a pair of active devices each having at least three electrodes, a source of energizing potential, a pair of loads connected between respective ones of said electrodes of each of said devices and said source of energizing potential, a unity-ratio transformer having a pair of windings, means connecting one of the remaining said electrodes of each of said devices to an extremity of respective ones of said transformer windings, means connecting the remaining extremities of said transformer windings to said source of energizing potential, a source of signals, and means connecting said source of signals between the remaining electrode of each of said devices and said remaining extremities of said transformer windings, said windings being connected in a phase reversal sense with respect to said source of signals.

10. A circuit comprising a pair of transistors each having a collector electrode, an emitter electrode and a base electrode, a unity-ratio transformer, means connecting said emitter electrodes to an extremity of respective windings of said transformer, a source of signals, means connecting said source of signals between said base electrodes and the remaining extremities of said transformer windings, said transformer windings being connected between said emitter electrodes and said source of signals in a phase reversal sense with respect to said source of signals, a pair of loads, means connecting an end of each of said loads to respective collector electrodes, a source of energizing potential, and means connecting said source of energizing potential between the other ends of said loads and said remaining extremities of said transformer windings.

11. In combination, a source of signals, a pair of amplifying devices each having an input circuit and an output circuit, means for applying substantially equal amounts of power from said source to said input circuits, load circuit means coupled to said output circuits and means for equalizing the power supplied to said load circuit means by said amplifying devices comprising a unity turns ratio transformer having first and second windings, means connecting said first winding in a first circuit common to the input and output circuits of one of said amplifying devices and means connecting said second winding in a second circuit common to the input and output circuits of the other of said devices which is similar to said first circuit so that said second winding is connected in said second circuit in a phase reversal sense with respect to said first winding in said first circuit.

References Cited in the file of this patent

UNITED STATES PATENTS

| | | |
|---|---|---|
| 2,497,166 | Goldberg et al. | Feb. 14, 1950 |
| 2,556,219 | Roche et al. | June 12, 1951 |

OTHER REFERENCES

Lo et al.: "Transistor Electronics," Sept. 15, 1955, page 83.